United States Patent
Orii et al.

(10) Patent No.: US 11,603,918 B2
(45) Date of Patent: Mar. 14, 2023

(54) STRAIN WAVE GEARING DEVICE

(71) Applicant: HARMONIC DRIVE SYSTEMS INC., Tokyo (JP)

(72) Inventors: Daisuke Orii, Azumino (JP); Syuhei Kobayashi, Azumino (JP); Norio Shirokoshi, Azumino (JP); Hiroshi Yamazaki, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 17/282,055

(22) PCT Filed: Nov. 22, 2018

(86) PCT No.: PCT/JP2018/043252
§ 371 (c)(1),
(2) Date: Apr. 1, 2021

(87) PCT Pub. No.: WO2020/105186
PCT Pub. Date: May 28, 2020

(65) Prior Publication Data
US 2021/0341048 A1 Nov. 4, 2021

(51) Int. Cl.
*F16H 57/04* (2010.01)
*F16H 49/00* (2006.01)

(52) U.S. Cl.
CPC ....... *F16H 57/0427* (2013.01); *F16H 49/001* (2013.01)

(58) Field of Classification Search
CPC ............... F16H 49/001; F16H 57/0427; F16H 57/0428; F16H 57/0471; F16C 33/586; F16C 35/078; F16C 35/067
See application file for complete search history.

(56) References Cited

U.S. PATENT DOCUMENTS 2,581,958 A * 1/1952 Kingston .............. F16C 33/586
  384/447
4,120,544 A * 10/1978 Huber .................. F16C 33/107
  384/292

(Continued)

FOREIGN PATENT DOCUMENTS

JP   S61206154 U   12/1986
JP   H0287152 U    7/1990
(Continued)

OTHER PUBLICATIONS

International Search Report (PCT/ISA/210) with translation and Written Opinion (PCT/ISA/237) dated Feb. 12, 2019, by the Japanese Patent Office as the International Searching Authority for International Application No. PCT/JP2018/043253.

(Continued)

*Primary Examiner* — Thomas C Diaz
(74) *Attorney, Agent, or Firm* — Buchanan Ingersoll & Rooney PC

(57) ABSTRACT

In a strain wave gearing device, fine first and second lubricant-holding grooves for holding lubricant are formed at fine pitches in an outer-race external peripheral surface of a wave generator bearing and an outer-race-contacting internal peripheral surface portion of an externally toothed gear in contact therewith. Fine lubricant-guiding grooves for guiding the lubricant to the outer-race-contacting internal peripheral surface portion are formed at fine pitches in a second internal peripheral surface portion, which adjoins the outer-race-contacting internal peripheral surface portion, of an internal peripheral surface of the externally toothed gear. This configuration improves the contact state between the outer-race-contacting internal peripheral surface portion of the externally toothed gear and the outer-race external (Continued)

peripheral surface, thus suppressing fretting wear occurring in these surfaces.

3 Claims, 3 Drawing Sheets

(56) References Cited

U.S. PATENT DOCUMENTS

| | | | | |
|---|---|---|---|---|
| 4,159,152 A | * | 6/1979 | Bjork | F16C 32/0644 |
| | | | | 384/291 |
| 8,876,396 B2 | * | 11/2014 | Guilford | F16C 33/62 |
| | | | | 384/549 |
| 10,612,595 B2 | * | 4/2020 | Zhong | F16C 35/067 |
| 2002/0178861 A1 | * | 12/2002 | Kobayashi | F16H 49/001 |
| | | | | 74/640 |
| 2018/0080543 A1 | * | 3/2018 | Kusumoto | F16H 57/0464 |
| 2019/0368594 A1 | * | 12/2019 | Sakata | B25J 9/042 |

FOREIGN PATENT DOCUMENTS

| | | |
|---|---|---|
| JP | H0291238 U | 7/1990 |
| JP | 2005321048 A | 11/2005 |
| JP | 2008223942 A | 9/2008 |
| JP | 2009041655 A | 2/2009 |
| JP | 2009108901 A | 5/2009 |
| JP | 2015190600 A | 11/2015 |
| JP | 2017214996 A | 12/2017 |
| WO | 2017077657 A1 | 5/2017 |

OTHER PUBLICATIONS

International Search Report (PCT/ISA/210) and Written Opinion (PCT/ISA/237) dated Feb. 5, 2019, by the Japanese Patent Office as the International Searching Authority for International Application No. PCT/JP2018/043252. (10 pages).

* cited by examiner (a)

(b)

STRAIN WAVE GEARING DEVICE

TECHNICAL FIELD

The present invention relates to a strain wave gearing device, and more specifically relates to a lubrication structure of a strain wave gearing device between an internal peripheral surface of an externally toothed gear and an outer-race external peripheral surface of a wave generator that comes into contact with the internal peripheral surface.

BACKGROUND ART

A known example of a wave generator of a strain wave gearing device is one provided with a rigid plug and a wave generator bearing, the wave generator bearing being mounted between a non-circular external peripheral surface of the plug and an internal peripheral surface of an externally toothed gear. The state of lubrication between an outer-race external peripheral surface of the wave generator bearing and the internal peripheral surface of the externally toothed gear is commonly boundary lubrication. Therefore, when the strain wave gearing device operates under specific operating conditions such as low-speed rotation in one direction and high-load operation, fretting wear occurs on the outer-race external peripheral surface and the internal peripheral surface of the externally toothed gear that comes into contact with the external peripheral surface. The state of contact between the outer-race external peripheral surface and the internal peripheral surface of the externally toothed gear must be improved to minimize fretting wear.

In the strain wave gearing device disclosed in Patent Document 1, recesses or protrusions for holding a lubricant are dispersed in the outer-race external peripheral surface or the internal peripheral surface of the externally toothed gear. The lubricant is held between the outer-race external peripheral surface and the internal peripheral surface of the externally toothed gear to minimize fretting wear. In Patent Document 2, a periodic structure of fine grating-form recessions and protrusions are formed in a sliding surface by surface processing using a femtosecond laser, and friction increase and annealing due to insufficient lubrication are prevented.

PRIOR ART LITERATURE

Patent Documents

Patent Document 1: JPU H02-87152 A
Patent Document 2: JP 2017-214996 A

SUMMARY OF THE INVENTION

Problems to be Solved by the Invention

An object of the present invention is to utilize fine grooves formed by, inter alia, surface processing using a femtosecond laser, etc., to improve the state of contact in a strain wave gearing device between an internal peripheral surface of an externally toothed gear and an outer-race external peripheral surface of a wave generator that comes into contact with the internal peripheral surface to enable fretting wear to be minimized.

Means of Solving the Problems

A strain wave gearing device of the present invention is provided with a rigid internally toothed gear, a flexible externally toothed gear, and a wave generator, the wave generator being provided with a rigid plug and a wave generator bearing, and the wave generator bearing being mounted between a non-circular external peripheral surface of the plug and an internal peripheral surface of the externally toothed gear. In the strain wave gearing device of this configuration, a lubrication structure that provides lubrication between the internal peripheral surface of the externally toothed gear and an outer-race external peripheral surface of the wave generator, which comes into contact with the internal peripheral surface, is configured as follows.

The internal peripheral surface of the externally toothed gear includes a first internal peripheral surface portion and a second internal peripheral surface portion. The first internal peripheral surface portion includes at least an outer-race-contacting internal peripheral surface portion that comes into contact with an outer-race external peripheral surface of an outer race of the wave generator bearing. The second internal peripheral surface portion is an internal peripheral surface portion that is adjacent to the first internal peripheral surface portion along a direction of a center axis. Lubricant-guiding grooves for guiding a lubricant toward the outer-race-contacting internal peripheral surface portion are formed in the second internal peripheral surface portion. The lubricant-guiding grooves have a width and a depth of several microns to several tens of nanometers, and these grooves are formed at intervals of several microns to several tens of nanometers. Lubricant-holding grooves for holding the lubricant are formed in either one or both of the first internal peripheral surface portion of the externally toothed gear and the outer-race external peripheral surface of the wave generator bearing. The lubricant-holding grooves have a width and a depth of several microns to several tens of nanometers, and these grooves are formed at intervals of several microns to several tens of nanometers.

Fine lubricant-guiding grooves formed in the second internal peripheral surface portion of the externally toothed gear have a width and a depth of several microns or less, and are easily wetted by the lubricant. The lubricant supplied to an inner side of the externally toothed gear moves along the lubricant-guiding grooves. Due to the width, depth, and direction of the lubricant-guiding grooves being appropriately set, the lubricant in contact with the lubricant-guiding grooves is guided toward the adjacent first internal peripheral surface portion and supplied to a contact portion between the outer-race-contacting internal peripheral surface portion and the outer-race external peripheral surface.

Fine lubricant-holding grooves are formed between the outer-race-contacting internal peripheral surface portion of the externally toothed gear and the outer-race external peripheral surface of the wave generator bearing. The lubricant-holding grooves have a width and a depth of several microns or less and are easily wetted by the lubricant, the lubricant is efficiently held in these grooves (supporting effect), a highly rigid oil film is formed, and the oil film also becomes thicker (dynamic pressure effect). An effect of promoting a good fit between metal contacting portions is also obtained. These effects are further promoted due to the lubricant being supplied to the contacting portions by the lubricant-guiding grooves.

As a result, the state of contact between the outer-race-contacting internal peripheral surface portion of the externally toothed gear and the outer-race external peripheral surface of the wave generator bearing, sliding characteristics, annealing resistance, etc., can be improved, and fretting wear can be effectively minimized. Additionally, the capability of the contacting portions to hold the oil film improves, and an amount of lubricant coating can be reduced. Another effect obtained is that reducing the amount of lubricant applied results in lower lubricant stirring resistance and higher efficiency of the strain wave gearing device.

MODE FOR CARRYING OUT THE INVENTION

An embodiment of a strain wave gearing device provided with a lubrication structure to which the present invention is applied is described below with reference to the drawings. The description below is an example in which the present invention is applied to a cup-type strain wave gearing device. The present invention can be similarly applied to a top-hat-type strain wave gearing device or a flat-type strain wave gearing device.

Figure 1:
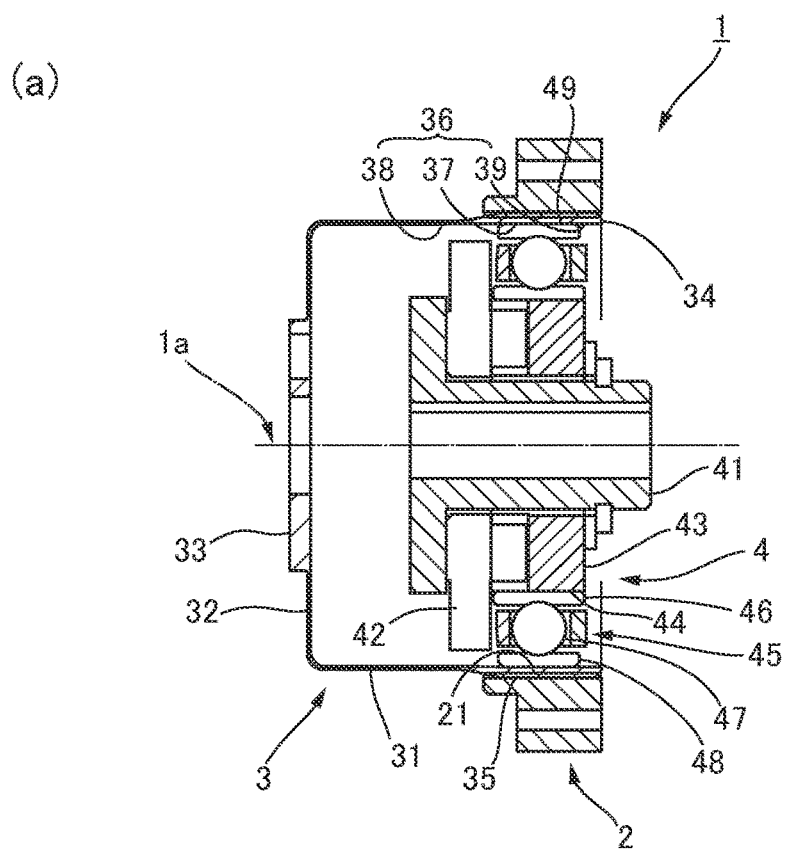
FIG. 1(a) is a schematic longitudinal cross-sectional view and (b) a schematic end-surface view of one example of a strain wave gearing device to which the present invention is applied.
Figure 1:
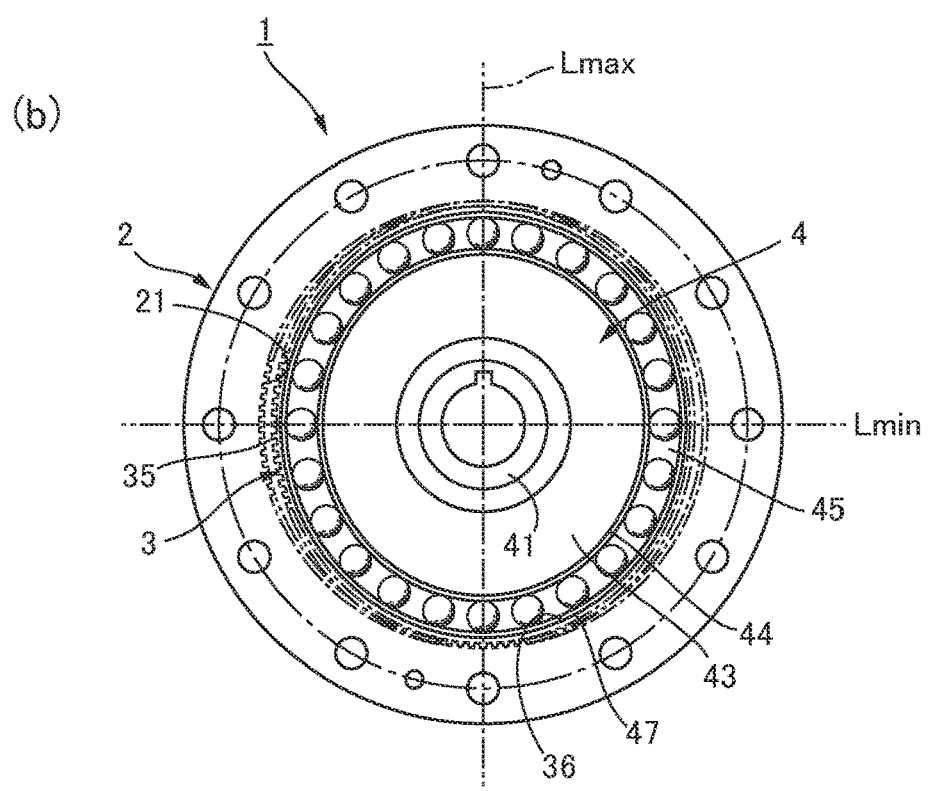

FIG. 1(a) is a schematic longitudinal cross-sectional view of an overall configuration of a cup-type strain wave gearing device (referred to below simply as a "strain wave gearing device"), and FIG. 1(b) is a schematic end-surface view of the same. A strain wave gearing device 1 is configured from an annular rigid internally toothed gear 2, a cup-shaped flexible externally toothed gear 3 coaxially disposed on an inner side of the internally toothed gear, and an ellipsoidally contoured wave generator 4 fitted into an inner side of the externally toothed gear.

The externally toothed gear 3 is provided with a barrel part 31, a diaphragm 32, and a boss 33, and the externally toothed gear 3 assumes the overall shape of a cup. The barrel part 31 has a cylindrical shape and is capable of flexing in a radial direction. One end of the barrel part 31 is an open end 34, and external teeth 35 are formed in an external peripheral surface portion of the barrel part in the side having the open end 34. The diaphragm 32 extends radially inward as a continuation of the other end of the barrel part 31. The annular boss 33 is formed as a continuation of an inner peripheral edge of the diaphragm 32. The boss 33 is a rigid portion for attaching the externally toothed gear 3 to another member (not shown). The internally toothed gear 2 is disposed so as to surround the external teeth 35 of the externally toothed gear 3. The external teeth 35 are capable of meshing with internal teeth 21 formed in an internal peripheral surface of the internally toothed gear 2.

The wave generator 4 is configured from a hollow hub 41, a rigid wave generator plug 43 mounted on an external periphery of the hub with an Oldham coupling 42 therebetween, and a wave generator bearing 45 fitted into an ellipsoidal plug external peripheral surface 44 (non-circular external peripheral surface) of the wave generator plug 43. The wave generator bearing 45 is provided with an inner race 46, an outer race 47, and a plurality of balls 48 (rolling elements) mounted between the races. The portion in the barrel part 31 of the externally toothed gear 3 where the external teeth 35 are formed is caused by the wave generator 4 to flex from a true circle, which is the initial state, into an ellipsoidal shape. The external teeth 35 mesh with the internal teeth 21 of the internally toothed gear 2 at portions including positions of both ends of a long axis Lmax of the ellipsoid.

When the wave generator 4 rotates about a center axis 1a, the meshing positions of the gears 2, 3 move in a circumferential direction. As a result, relative rotation occurs between the externally toothed gear 3 and the internally toothed gear 2 in accordance with a difference in the number of teeth between the external teeth 35 and the internal teeth 21. For example, if the internally toothed gear 2 is secured and the wave generator 4 is a high-speed rotation input element, the externally toothed gear 3 is a reduced rotation output element, from which rotation output, reduced in speed according to the difference in the number of teeth between the gears 2, 3, is acquired.

In an internal peripheral surface 36 of the barrel part 31 of the externally toothed gear 3, an internal peripheral surface portion on the side having the open end 34 is a first internal peripheral surface portion 37A including an outer-race-contacting internal peripheral surface portion 37. The outer-race-contacting internal peripheral surface portion 37 is in contact with an outer-race external peripheral surface 49 of the outer race 47 of the wave generator bearing 45. In the internal peripheral surface 36, an internal peripheral surface portion from the first internal peripheral surface portion 37A to the diaphragm 32 is a second internal peripheral surface portion 38. In the present example, an open-end-side internal peripheral surface portion 39 of slight width, which is not in contact with the outer-race external peripheral surface 49, is formed in the internal peripheral surface 36 between the outer-race-contacting internal peripheral surface portion 37 and the open end 34. In the present example, the internal peripheral surface portion including the outer-race-contacting internal peripheral surface portion 37 and the open-end-side internal peripheral surface portion 39 is the first internal peripheral surface portion 37A. The internal peripheral surface portion adjacent to the first internal peripheral surface portion 37A in the direction of the center axis 1a is the second internal peripheral surface portion 38.

Figure 2:
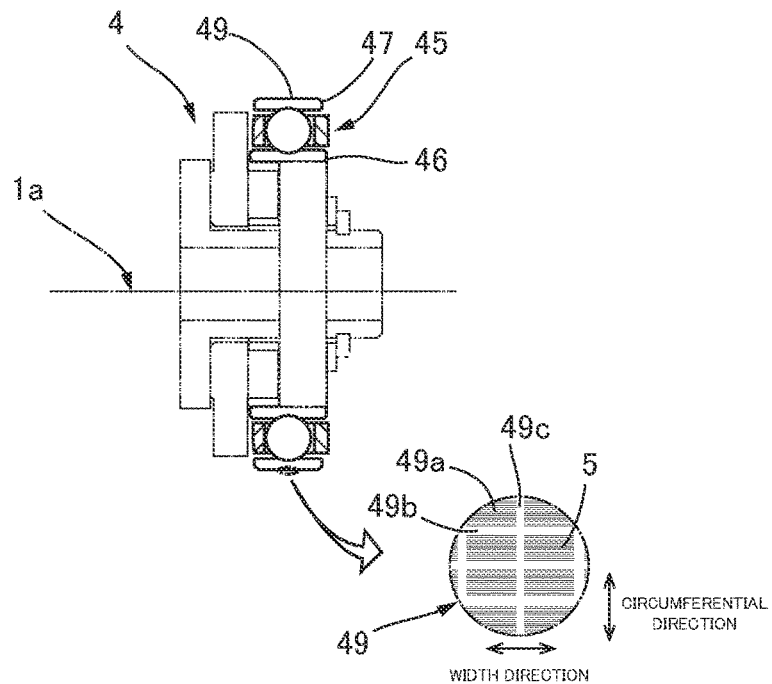
FIG. 2(a) is an explanatory drawing of lubricant-holding grooves in an outer-race external peripheral surface, and FIGS. (b1) and (b2) are explanatory drawings of lubricant-holding grooves and lubricant-guiding grooves in an internal peripheral surface of an externally toothed gear.
Figure 2:
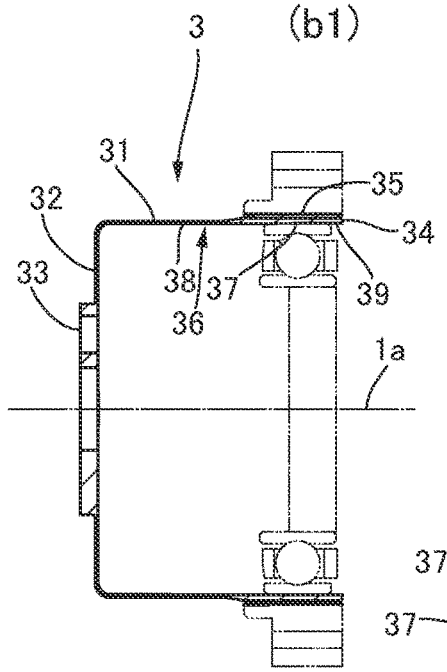
Figure 2:
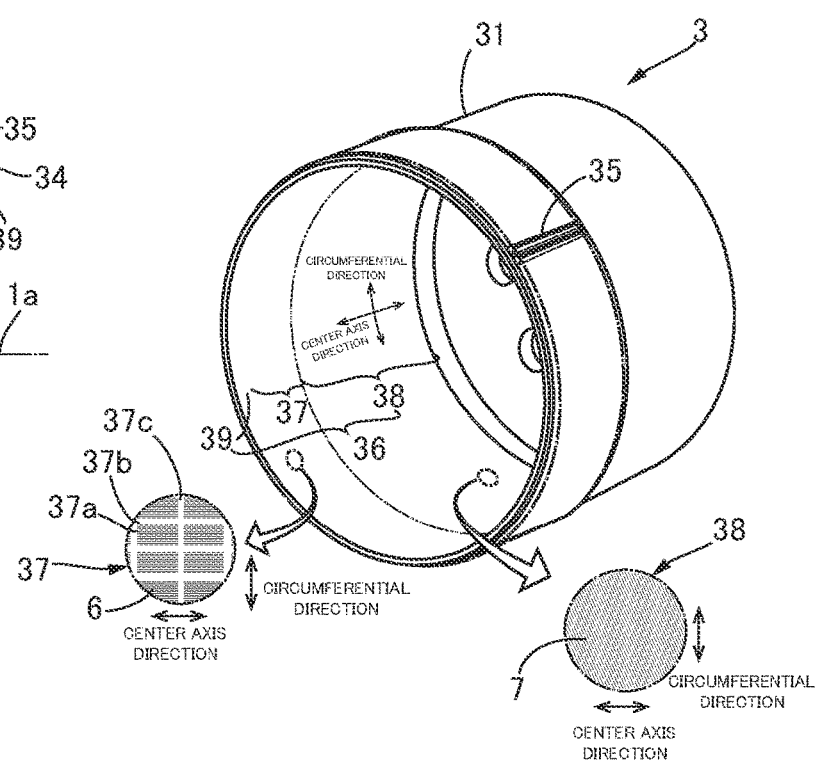

FIG. 2(a) is an explanatory drawing of one example of a groove pattern of lubricant-holding grooves formed in the outer-race external peripheral surface 49 of the wave generator 4. FIGS. 2(b1) and 2(b2) are explanatory drawings of one example of a groove pattern of lubricant-holding grooves formed in the first internal peripheral surface portion 37A of the externally toothed gear 3, and one example of a groove pattern of lubricant-guiding grooves formed in the second internal peripheral surface portion 38.

First lubricant-holding grooves 5 for holding a lubricant are formed in the outer-race external peripheral surface 49 of the wave generator bearing 45. Second lubricant-holding grooves 6 for holding the lubricant are also formed in the first internal peripheral surface portion 37A of the externally toothed gear 3. Both the first and second lubricant-holding grooves 5, 6 have a width and a depth of several microns to several tens of nanometers, and both are formed at intervals of several microns to several tens of nanometers. In the present example, from the viewpoint of processing, etc., the second lubricant-holding grooves 6 are also formed in the open-end-side internal peripheral surface portion 39 as well as in the outer-race-contacting internal peripheral surface portion 37. Lubricant-guiding grooves 7 for guiding the lubricant toward the outer-race-contacting internal peripheral surface portion 37 are formed in the second internal peripheral surface portion 38 of the externally toothed gear 3. The lubricant-guiding grooves 7 have a width and a depth of several microns to several tens of nanometers, and are formed at intervals of several microns to several tens of nanometers. The fine first and second lubricant-holding grooves 5, 6 and the fine lubricant-guiding grooves 7 can be formed by, for example, laser processing using a femtosecond laser. These patterns can also be formed by a processing method such as machining or etching. Additionally, the first and second lubricant-holding grooves 5, 6 and the lubricant-guiding grooves 7 can also be imparted with various cross-sectional shapes such as a rectangular cross section, a semicircular cross section, and a V groove.

FIG. 2(a) schematically shows an enlargement of part of the outer-race external peripheral surface 49. In the outer-race external peripheral surface 49 of the wave generator bearing 45, grooved areas 49a and non-grooved areas 49b are alternatingly formed at a fixed pitch over the entire periphery of the outer-race external peripheral surface 49 of the wave generator bearing 45, as shown in FIG. 2(a). Grooved areas 49a and non-grooved areas 49c are alternately formed in a width direction of the outer-race external peripheral surface 49 (a direction along the center axis 1a) as well. Parallel arranged groove patterns of first lubricant-holding grooves 5 are formed in the grooved areas 49a. Specifically, each of the first lubricant-holding grooves 5 constituting the parallel arranged groove patterns is a linear groove having a depth of several microns to several tens of nanometers, these grooves being formed at intervals of several microns to several tens of nanometers and extending in a width direction of the outer race 47.

FIG. 2(b2) schematically shows enlargements of part of the first internal peripheral surface portion 37A and part of the second internal peripheral surface portion 38 of the externally toothed gear 3. As shown in these drawings, grooved areas 37a and non-grooved areas 37b are alternately formed at a fixed pitch along a circumferential direction of the first internal peripheral surface portion 37A of the externally toothed gear 3. Additionally, in the first internal peripheral surface portion 37A, grooved areas 37a and non-grooved areas 37c are alternately formed at a fixed pitch in the direction of the center axis 1a as well. Parallel arranged groove patterns of second lubricant-holding grooves 6 are formed in the grooved areas 37a. Specifically, each of the second lubricant-holding grooves 6 constituting the parallel arranged groove patterns is a linear groove having a depth of several microns to several tens of nanometers, these grooves being formed at intervals of several microns to several tens of nanometers. The second lubricant-holding grooves 6 extend parallel to a direction along the center axis 1a of the externally toothed gear 3. Parallel arranged groove patterns configured from second lubricant-holding grooves 6 are similarly formed in the open-end-side internal peripheral surface portion 39 as well.

Helical arranged groove patterns of the lubricant-guiding grooves 7 are formed in the second internal peripheral surface portion 38 of the externally toothed gear 3. Specifically, numerous lubricant-guiding grooves 7 extending in a helical formation are formed in the second internal peripheral surface portion 38, at a fixed pitch in the direction along the center axis 1a. The helical lubricant-guiding grooves 7 are grooves having a depth of several microns to several tens of nanometers, and are formed at intervals of several microns to several tens of nanometers.

Thus, in the strain wave gearing device 1 of the present embodiment, helical arranged groove patterns of fine lubricant-guiding grooves 7 are formed in the entire second internal peripheral surface portion 38 in the internal peripheral surface 36 of the externally toothed gear 3, and parallel arranged groove patterns of fine second lubricant-holding grooves 6 are formed in the first internal peripheral surface portion 37A including the outer-race-contacting internal peripheral surface portion 37. Additionally, parallel arranged groove patterns of fine first lubricant-holding grooves 5 are also formed in the outer-race external peripheral surface 49.

In the strain wave gearing device 1, for example, rotation is inputted to the wave generator 4 and reduced rotation is delivered at a load side from the boss 33 of the externally toothed gear 3. When the strain wave gearing device 1 is operating, the fine lubricant-guiding grooves 7 formed in the entire second internal peripheral surface portion 38 of the externally toothed gear 3 rotating at a reduced rate effectively guide the lubricant guided toward the outer-race-contacting internal peripheral surface portion 37 and supply the lubricant to a contact portion between the outer-race-contacting internal peripheral surface portion 37 and the outer-race external peripheral surface 49. The lubricant is supplied from the lubricant-guiding grooves 7 toward the second lubricant-holding grooves 6 and is held in the second lubricant-holding grooves 6 and the first lubricant-holding grooves 5 on the side having the outer-race external peripheral surface 49.

Because the fine first and second lubricant-holding grooves 5, 6 are formed in the outer-race-contacting internal peripheral surface portion 37 and the outer-race external peripheral surface 49, a good fit between these metal contact portions is promoted. The lubricant-supporting effect between the contact surfaces is improved by the lubricant held in the fine first and second lubricant-holding grooves 5, 6, the lubricant being supplied from the side having the lubricant-guiding grooves 7. Furthermore, a highly rigid oil film can be increased thickness and a dynamic pressure effect is improved. As such, the state of contact between the contact surfaces can be improved, and fretting wear in the outer-race-contacting internal peripheral surface portion 37 and the outer-race external peripheral surface 49 can be minimized. Furthermore, an amount of lubricant coating between the contact surfaces can be reduced by improving the capability for an oil film to be held between contact surfaces. An additional effect is thereby obtained in that lubricant stirring resistance decreases and the efficiency of the strain wave gearing device 1 can therefore be improved.

[Lubricant-Holding Grooves, Lubricant-Guiding Grooves]

The lubricant-holding grooves (the first and second lubricant-holding grooves 5, 6 in the example above) and the lubricant-guiding grooves (the lubricant-guiding grooves 7 in the example above) can be formed in various configurations, as follows.

(Regions of Groove Processing)

Lubricant-holding grooves can be formed in the outer-race-contacting internal peripheral surface portion 37 of the externally toothed gear 3 and in the outer-race external peripheral surface 49, as in the example above. An alternative is to form lubricant-holding grooves only in the outer-race-contacting internal peripheral surface portion 37. Another option is to form lubricant-holding grooves only in the outer-race external peripheral surface 49. Lubricant-guiding grooves are formed in the second internal peripheral surface portion 38 of the externally toothed gear 3.

(Ranges of Groove Processing)

Lubricant-holding grooves can be formed over the entire surface of the outer-race-contacting internal peripheral surface portion 37. Additionally, grooved portions in which lubricant-holding grooves are formed and non-grooved portions in which lubricant-holding grooves are not formed may be alternately formed in the outer-race-contacting internal peripheral surface portion 37, along either the circumferential direction thereof or the direction of the center axis 1a. Similarly, lubricant-holding grooves can be formed over the entire outer-race external peripheral surface 49. Additionally, grooved portions in which lubricant-holding grooves are formed and non-grooved portions in which lubricant-holding grooves are not formed may be alternately formed in the outer-race external peripheral surface 49, along either the circumferential direction or the width direction thereof. Lubricant-guiding grooves can be formed in all or part of the second internal peripheral surface portion 38 of the externally toothed gear 3. Additionally, grooved portions in which lubricant-guiding grooves are formed and non-grooved portions in which lubricant-guiding grooves are not formed may be alternately formed in the second internal peripheral surface portion 38, along either the circumferential direction thereof or the direction of the center axis 1a.

(Direction of Groove Formation)

The lubricant-holding grooves formed in the outer-race-contacting internal peripheral surface portion 37 of the externally toothed gear 3 can be grooves extending in a direction along the center axis 1a, grooves extending in the circumferential direction, oblique grooves extending in a direction inclined relative to a direction along the center axis 1a, helical grooves extending in helical form, grooves in a mesh pattern, etc. The lubricant-holding grooves formed in the outer-race external peripheral surface 49 can be grooves extending parallel to a direction along the width direction of this surface, grooves extending in the circumferential direction, oblique grooves extending in a direction inclined relative to the width direction, helical grooves extending in helical form, grooves in a mesh pattern, etc. In the second internal peripheral surface portion 38 of the externally toothed gear 3, the lubricant-guiding grooves can be grooves extending in a direction along the center axis 1a, grooves extending in the circumferential direction, oblique grooves extending in a direction inclined relative to a direction along the center axis 1a, helical grooves extending in helical form, grooves in a mesh pattern, etc.

(Groove Shape)

The lubricant-holding grooves and the lubricant-guiding grooves can be linear, curved, or corrugated (serpentine). Additionally, the width can be fixed. The width may gradually increase or gradually decrease along a length direction of the grooves. Width, depth, and groove interval (pitch) can be values within a range of several microns to several nanometers.

(Groove Arrangement Pattern)

The groove arrangement pattern may be, for example, a combination pattern in which a groove arrangement pattern composed of grooves extending in the circumferential direction is formed so as to intersect a groove arrangement pattern composed of grooves parallel to the center axis 1a of the externally toothed gear 3 (the width direction of the outer-race external peripheral surface 49). A combination of various groove arrangement patterns can be adopted.

(Boundary Portion of Lubricant-Guiding Grooves and Lubricant-Holding Grooves)

In the internal peripheral surface 36 of the externally toothed gear 3, the second lubricant-holding grooves 6 on the side having the first internal peripheral surface portion 37A and the lubricant-guiding grooves 7 on the side having the second internal peripheral surface portion 38 could be connected to each other or separated from each other, some grooves could be connected to each other, etc. The boundary portion of the grooves 6, 7 should be formed so that the lubricant is quickly guided from the lubricant-guiding grooves 7 to the second lubricant-holding grooves 6.

For example, the second lubricant-holding grooves 6 and the lubricant-guiding grooves 7 can be separated from each other. Specifically, in the boundary portion between the first internal peripheral surface portion 37A and the second internal peripheral surface portion 38, non-grooved areas are formed at a predetermined width over the entire circumferential direction of the internal peripheral surface 36. Additionally, the second lubricant-holding grooves 6 and the lubricant-guiding grooves 7 can be formed in a state of being adjacent to each other. Furthermore, portions where the second lubricant-holding grooves 6 and the lubricant-guiding grooves 7 are formed overlapping each other and portions where these grooves are separated at fixed intervals can be alternately formed along the circumferential direction of the internal peripheral surface 36. Furthermore, the second lubricant-holding grooves 6 and the lubricant-guiding grooves 7 can also be formed overlapping each other at a predetermined width over the entire circumferential direction of the internal peripheral surface 36.

(Example of Groove Arrangement Pattern)

Figure 3:
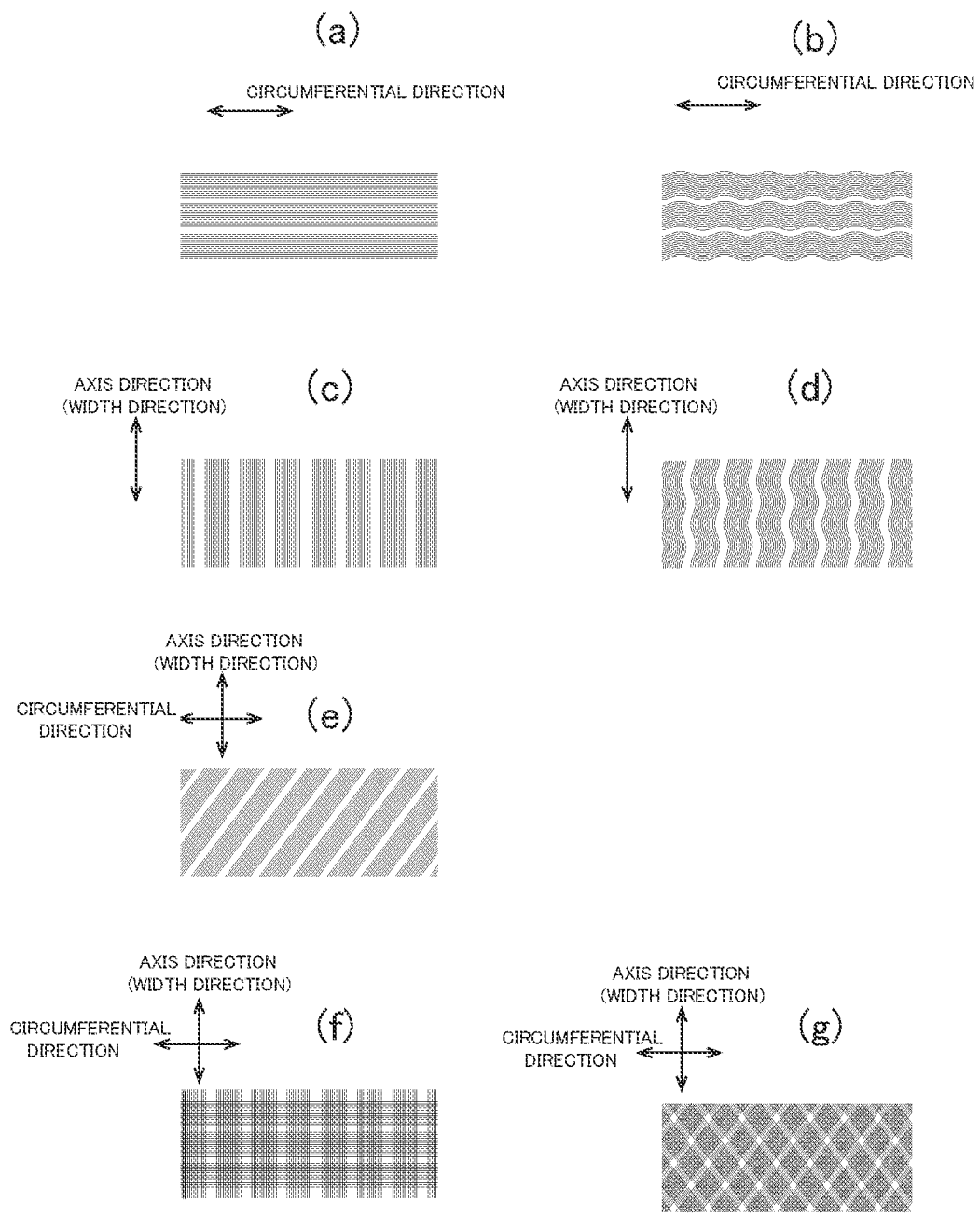
FIGS. 3(a) to (g) are explanatory drawings of examples of arrangement patterns of lubricant-holding grooves and lubricant-guiding grooves.

FIG. 3 displays explanatory drawings schematically showing examples of arrangement patterns of the first and second lubricant-holding grooves 5, 6 and the lubricant-guiding grooves 7. In the description below, the first internal peripheral surface portion 37A, the second internal peripheral surface portion 38, and the outer-race external peripheral surface 49, in which grooves are formed, are described as groove formation surfaces, and the first and second lubricant-holding grooves 5, 6 and the lubricant-guiding grooves 7 are described as fine grooves. FIG. 3 exemplifies typical arrangement patterns and arrangement patterns that can be adopted in the present invention are not limited to the examples shown in FIG. 3.

In the groove formation surfaces, fine grooves are formed in arrangement patterns extending in a linear or curved manner in a predetermined direction at a predetermined pitch. For example, as shown in FIG. 3(a), a groove formation surface can have an arrangement pattern in which fine grooves extend linearly in the circumferential direction of the groove formation surface (the circumferential direction of the outer-race external peripheral surface 49 or the circumferential direction of the internal peripheral surface 36 of the barrel part 31 of the externally toothed gear 3) at a fixed pitch. Additionally, as shown in FIG. 3(b), a groove formation surface can have an arrangement pattern in which fine grooves extend in a corrugated formation in the circumferential direction at a fixed pitch.

As shown in FIG. 3(c), a groove formation surface can have an arrangement pattern in which fine grooves, arranged at a fixed pitch, extend linearly in a direction of a center axis (the width direction of the outer-race external peripheral surface 49 or the direction of the center axis of the internal peripheral surface 36 of the barrel part 31 of the externally toothed gear) orthogonal to the circumferential direction of the groove formation surface. As shown in FIG. 3(d), a groove formation surface can have an arrangement pattern in which fine grooves, arranged at a fixed pitch, extend in a corrugated formation in a center axis direction orthogonal to the circumferential direction of the groove formation surface. Additionally, as shown in FIG. 3(e), a groove formation surface can have an inclined arrangement pattern in which fine grooves, arranged at a fixed pitch, extend linearly in an oblique direction that is inclined relative to the circumferential direction of the groove formation surface and the direction of the center axis.

As is shown in FIGS. 3(f) and (g), the same groove formation surface can have an intersecting arrangement pattern, which is the intersecting of a first-direction arrangement pattern in which fine grooves extend in a first direction at a fixed pitch and a second-direction arrangement pattern in which fine grooves extend in a second direction, different from the first direction, at a fixed pitch. In the intersecting arrangement pattern shown in FIG. 3(f), the first-direction arrangement pattern is composed of fine grooves extending linearly in the circumferential direction, and the second-direction arrangement pattern is composed of fine grooves extending linearly in the axial direction. In the intersecting arrangement pattern shown in FIG. 3(g), the first-direction arrangement pattern is an inclined arrangement pattern formed from linear fine grooves extending in a direction inclined 45 degrees relative to the circumferential direction and the axial direction, and the second-direction arrangement pattern is an inclined arrangement pattern formed from linear fine grooves extending in a direction inclined 45 degrees in the opposite direction relative to the circumferential direction and the axial direction. Furthermore, an intersecting arrangement pattern that is an overlapping of the arrangement pattern shown in FIG. 3(a) and the arrangement pattern shown in FIG. 3(b) can also be formed in a groove formation surface.

The invention claimed is:

1. A strain wave gearing device comprising:
    a rigid internally toothed gear; a flexible externally toothed gear; and a wave generator, the wave generator being provided with a rigid plug and a wave generator bearing, and the wave generator bearing being mounted between a non-circular external peripheral surface of the plug and an internal peripheral surface of the externally toothed gear,
    wherein the internal peripheral surface of the externally toothed gear includes a first internal peripheral surface portion and a second internal peripheral surface portion, the first internal peripheral surface portion includes at least an outer-race-contacting internal peripheral surface portion that comes into contact with an outer-race external peripheral surface of an outer race of the wave generator bearing, and the second internal peripheral surface portion is adjacent to the first internal peripheral surface portion along a direction of a center axis,
    wherein lubricant-guiding grooves for guiding a lubricant toward the first internal peripheral surface portion are formed in the second internal peripheral surface portion, the lubricant-guiding grooves having a width and a depth and being formed at intervals sufficient to guide lubricant to the first internal peripheral surface portion, and
    wherein lubricant-holding grooves for holding the lubricant are formed in both of the first internal peripheral surface portion of the externally toothed gear and the outer-race external peripheral surface of the wave generator bearing, the lubricant-holding grooves having a width and a depth and being formed at intervals sufficient to hold lubricant between the first internal peripheral surface portion and the outer-race external peripheral surface of an outer race of the wave generator bearing, and
    wherein the lubricant-guiding grooves are formed in the second internal peripheral surface portion over an entire surface thereof,
    wherein, in the first internal peripheral surface portion, first grooved portions in which the lubricant-holding grooves are formed and first non-grooved portions in which the lubricant-holding grooves are not formed are alternately formed along either a circumferential direction of the first internal peripheral surface portion or the direction of the center axis, each of the first grooved portions including a plurality of the lubricant-holding grooves, each of the first non-grooved portions having a width that is larger than a width of a plurality of the lubricant-holding grooves,
    wherein, in the outer-race external peripheral surface, second grooved portions in which the lubricant-holding grooves are formed and second non-grooved portions in which the lubricant-holding grooves are not formed are alternately formed along either a circumferential direction of the outer-race external peripheral surface or a width direction thereof, and each of the second grooved portions including a plurality of the lubricant-holding grooves, each of the second non-grooved portions having a width that is larger than a width of a plurality of the lubricant-holding grooves.

2. The strain wave gearing device according to claim 1, wherein the lubricant-guiding grooves are either one of:
    grooves extending linearly, curvedly or corrugated along the direction of the center axis;
    grooves extending linearly, curvedly or corrugated along the circumferential direction of the internal peripheral surface of the externally toothed gear;
    grooves extending linearly, curvedly or corrugated along a direction inclined relative to a direction along the center axis;
    grooves in helical form; and
    grooves in a meshed pattern.

3. The strain wave gearing device according to claim 1, wherein the lubricant-holding grooves are either one of:
    grooves extending linearly, curvedly or corrugated along the center axis;
    grooves extending linearly, curvedly or corrugated along the circumferential direction of the internal peripheral surface of the externally toothed gear;
    grooves extending linearly, curvedly or corrugated along a direction inclined relative to a direction along the center axis;
    grooves in helical form; and
    grooves in a meshed pattern.

* * * * *